United States Patent [19]

Escobedo et al.

[11] Patent Number: 5,286,147
[45] Date of Patent: Feb. 15, 1994

[54] DEPTH GAGE ADAPTER

[76] Inventors: Francisco Escobedo, 23305 Ladeene Ave., Torrance, Calif. 90505; Jose L. Ochoa, 22209 S. Vermont Ave. #7, Torrance, Calif. 90502

[21] Appl. No.: 962,743

[22] Filed: Oct. 19, 1992

[51] Int. Cl.⁵ ............................................. B23B 49/00
[52] U.S. Cl. ..................................... 409/218; 33/628; 408/14; 409/184
[58] Field of Search ............... 409/210, 214, 218, 184; 408/14, 16, 202, 241 S; 33/628, 630, 638

[56] References Cited

U.S. PATENT DOCUMENTS

| | | | |
|---|---|---|---|
| 2,667,105 | 1/1954 | Stephan | 409/210 X |
| 3,224,104 | 12/1965 | Platt, II | 408/16 X |
| 3,435,730 | 4/1969 | Berberian | 408/16 X |
| 3,724,963 | 4/1973 | Stadtmiller | 408/14 |
| 4,574,441 | 3/1986 | Kronfeld | 409/210 X |

FOREIGN PATENT DOCUMENTS 1146326 9/1957 Fed. Rep. of Germany ........ 408/14

Primary Examiner—Z. R. Bilinsky
Attorney, Agent, or Firm—Roger A. Marrs

[57] ABSTRACT

An adapter for mounting a depth gage onto a mill head of a milling machine is disclosed herein having an elongated mounting bracket with an outwardly projecting block for slidably carrying an indicator rod with spaced apart depth V grooves thereon. The block has a viewing hole for visual observation of the V grooves and an adjustment screw retains the rod at a selected location on the rod. An adjustable anvil is carried on the rod below the markings and has a broad, flat surface cantilevered outwardly beyond the rod and its mounting block so as to receive engagement with the sensing probe of a conventional depth gage mounted on the machine.

4 Claims, 1 Drawing Sheet

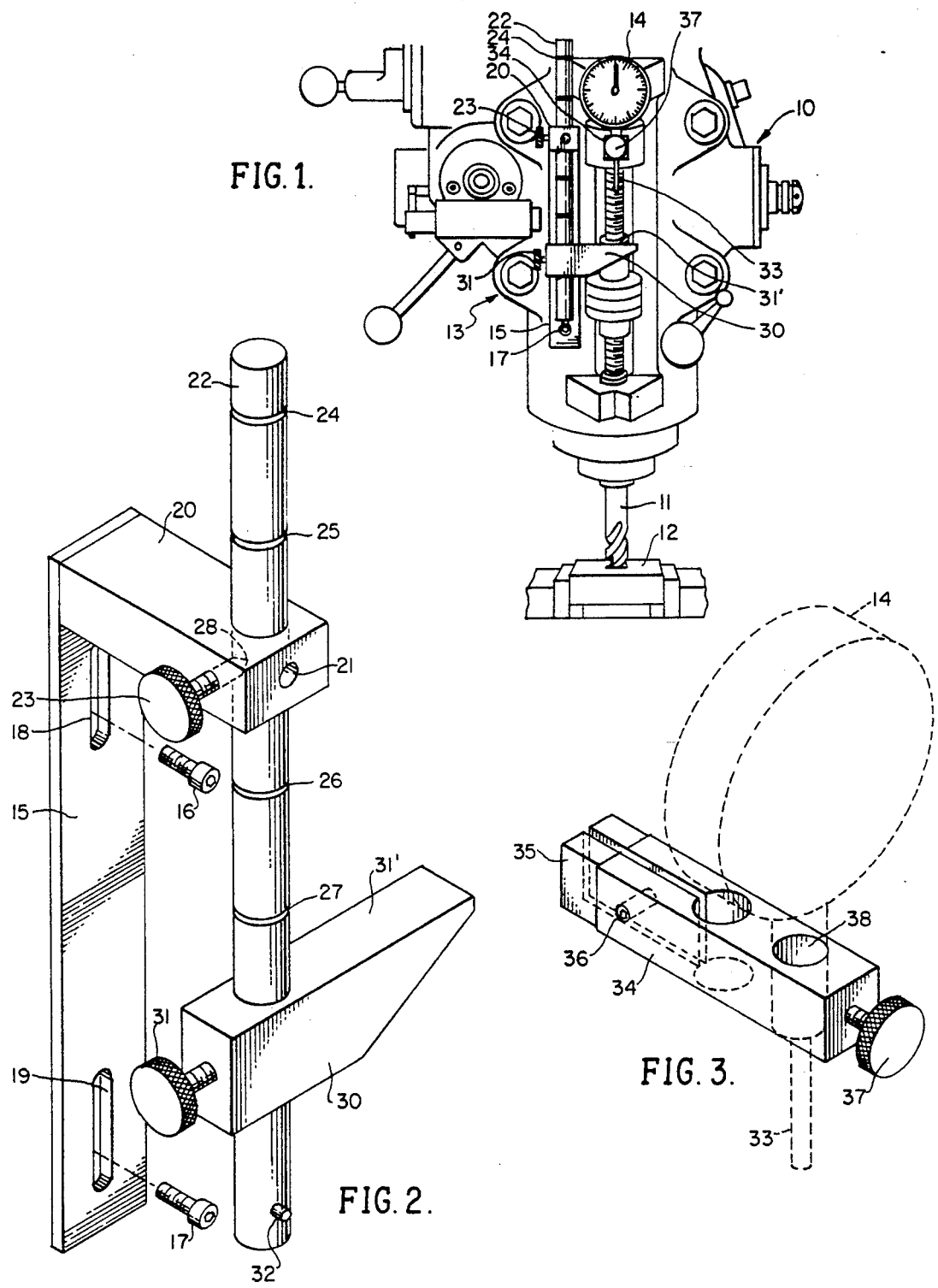

DEPTH GAGE ADAPTER

BACKGROUND OF THE INVENTION

1. Field of the Invention

The present invention relates to the field of adapters for depth gages, and more particularly to a novel adapter which can readily be mounted on a milling machine or the like and which allows precise reading for full extent of travel and does not interfere with quill power feed.

2. Brief Description of the Prior Art

In the past, it has been the conventional practice to place a depth gage on a milling or drilling machine which would provide a visual indication of travel as the drill or cutting tool works on the work piece. In this connection, it is the usual practice to place an analog scale, such as a ruler, adjacent to the drill or mill head so that the visual depth of the cutting procedure can be followed and controlled. Problems and difficulties have been encountered when employing such a scale, which stem largely from the fact that the visual indication is difficult to correlate and the accuracy of the scale is greatly reduced when compared with conventional pressure or distance gages.

Therefore, a long-standing need has existed to provide a means for placing a depth gage or indicator adjacent to the cutting head of the machine whereby the depth of cut, for example, can be read with precision. This arrangement must allow for precise reading for the full extent of travel and should not interfere with the quill power feed. Also, quick change to any depth within seconds is a valuable asset and the adaptability of such a device should fit multiple types of milling heads.

SUMMARY OF THE INVENTION

Accordingly, the above problems and difficulties are overcome by the present invention which provides a novel adapter that is conveniently mounted on a machine adjacent to the cutting tool so that precise reading for full extent of travel is indicated by a conventional gage. The adapter includes a mounting bracket incorporating a block which slidably receives an indicator rod. Means are provided on the block for adjusting the rod to a desired indication and the rod further carries a limit stop taking the form of an anvil with a broad, flat surface arranged to engage with the sensing quill or indicator of the gage as the cutting procedure proceeds.

Therefore, it is among the primary objects of the present invention to provide an adapter for a sensing gage which will not interfere with the power feed of the machine on which it is mounted.

Another object of the present invention is to provide a novel adapter for mounting a depth gage on a cutting machine, which will not interfere with the full extent of quill or drill travel.

Still another object is to provide a novel adapter for a gage mountable in an adjustable manner on a cutting machine, such as a mill or the like, which will account for tilting of the mill head.

Yet another object of the present invention is to provide a novel adapter for a depth gage that will not interfere with the tilting of the mill head, as well as with micrometer nut and lock nut arrangements.

Still a further object is to provide a versatile adapter for a depth gage that will be easy to install on a variety of cutting mills, and which has the ability to provide a quick change of depth setting in a matter of seconds.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front elevational view of a milling machine showing the novel adapter installed thereon in connection with a depth gage;

FIG. 2 is an enlarged perspective view of the novel adapter incorporating the present invention;

FIG. 3 is a perspective view of a mount for the depth gage shown in FIG. 1.

DESCRIPTION OF THE PREFERRED EMBODIMENT

Referring to FIG. 1, a conventional milling machine is broadly indicated by the numeral 10 which includes a drill 11 rotated by the machine so as to drill a hole of selected depth into a work piece 12. In accordance with the present invention, a mounting is illustrated in the direction of arrow 13 which is used cooperating with a conventional depth gage 14. The adapter of the present invention includes a mounting bracket 15 that is secured to the face of the machine 10 by mounting screws 16 and 17 as shown in FIG. 2. The screws include enlarged heads which bear against the bracket 15 as the shank of the screws is placed through respective slots 18 and 19. The slots are elongated so that the screws may be fitted with threaded receptacles in the face of a variety of hole spacings.

Referring now to FIGS. 1 and 2, it can be seen that the bracket 15 includes a mounting block 20 which outwardly projects from a selected end of the elongated bracket 15 and terminates in or with a hole 21 that may be referred to as a viewing opening. The end of the block 20 also includes a bore normal to the central longitudinal axis of the block through which an elongated rod 22 is movably mounted. A selected position on the mounting block is held by a retaining screw 23 that may readily be operated by the user's fingers. It is to be particularly noted that a plurality of spaced-apart indicating grooves or marking grooves are provided along the length of the rod. The uppermost groove is identified by numeral 24, while the next groove is identified by numeral 25. Numerals 26 and 27 refer to the next grooved markers, and it is to be understood that an additional groove marker is hidden by the block 20 but is made visible through the viewing opening 21. Each of the respective grooves is fixed with respect to the other grooves and includes tapered sidewalls so as to matingly receive a pointed or shaped end or tip 28 of the thumb screw 23.

It can also be seen in FIG. 2 that the adapter includes a stop means taking the form of an anvil 30 which also includes a thumb screw 31 having a flat end on its shaft for locking at a selected position The end of screw 31 is disclosed as hidden behind the body of the anvil 30 in FIG. 2. It is to be particularly noted that the anvil 30 includes a broad, flat surface 31' and that a pin 32 outwardly projects from the side of the rod 22 to prevent the anvil from slipping from the end of the rod. The surface 31 is intended to be engaged by the quill or stem of the gage 14 and the stem is indicated by numeral 33 in FIG. 1.

Referring now in detail to FIGS. 1 and 3, it can be seen that the depth gage 14 is carried on a gage support 34 which carries a bifurcated square stud 35. When stud 35 is inserted into the round bore, a set screw 36 is turned to expand the stud into tight frictional engagement with the quill stop of the milling machine. The gage is held in position on the support by means of a thumb screw 37 and the stem of the gage fits through an opening such as opening 38 so that the gage is seated on the support. Therefore, it can be seen in the above device that the arrangement allows for precision reading for full extent of travel and does not interfere with quill power feed. Quick change to any depth may be made within seconds and the adapter is versatile so as to fit a variety of different milling heads with easy installation. Once installed, as shown in FIG. 1, as the drill bit 11 moves into the work piece 12 during the cutting procedure, the stem 33 will eventually engage with the surface 31 of anvil 30 and an exact reading of distance, pressure or the like may be directly read on the gage. The rod 22 may be preset by introducing the thumb screw 23 to a respective groove 24–27 respectively.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an adapter for cooperating with a depth gage having a probe comprising the combination of:
    an elongated bracket with an exposed face having a pair of slots in fixed spaced-apart relationship;
    a mounting block having upper and lower surface secured at a selected end of said bracket so as to outwardly project beyond said face;
    said mounting block having an open-ended bore normal to a central longitudinal axis and a hole in said block in communication with said bore constituting a viewing opening;
    an elongated rod disposed in said block bore projecting beyond said upper and lower surfaces thereof;
    thumb screw means movably carried on said block for retaining said rod in position on said block; relationship to said fixed block having a broad flat, surface extending beyond said block;
    a support disposed adjacent to said bracket and extending over said stop means broad flat surface; and
    a depth gage carried on said support having a downwardly depending sensing probe movable with respect to said stop means and adapted to engage with said broad flat surface.

2. The invention as defined in claim 1 including:
    a second thumb screw movably carried on said support for releasably securing said gage with said support.

3. The invention as defined in claim 2 wherein:
    said rod includes a plurality of V-shaped grooves in fixed spaced-apart relationship along the length of said rod;
    said viewing opening being in visual registry with a selected one of said grooves; and
    said first-mentioned thumb screw means having a V-shaped pointed tip insertable into said selected one of said grooves.

4. The invention as defined in claim 3 wherein:
    said support includes a bifurcated square stud adapted to be insertably received into a mating opening; and
    a set screw rotatable to expand said bifurcated square stud into a tight supporting relationship within said mating opening.

* * * * *